May 31, 1960

I. D. PRESS 2,938,235

METHOD AND APPARATUS FOR SINTERING
POLYTETRAFLUOROETHYLENE TUBING

Filed Dec. 28, 1956

INVENTOR
IRVING D. PRESS
BY
Churchill, Weymouth & Engel
ATTORNEYS.

United States Patent Office 2,938,235
Patented May 31, 1960

2,938,235

METHOD AND APPARATUS FOR SINTERING POLYTETRAFLUOROETHYLENE TUBING

Irving D. Press, West Orange, N.J., assignor to Resistoflex Corporation, Roseland, N.J., a corporation of New York Filed Dec. 28, 1956, Ser. No. 631,156

5 Claims. (Cl. 18—55)

The present invention relates to the fabrication of tubular lengths of polytetrafluoroethylene resin, or the like. More specifically it relates to the sintering and/or quenching operations attending such fabrication.

The present invention can best be described with reference to the handling of the specific resin mentioned above, and, therefore, the following description will be so limited. However, it is to be understood, as will appear hereinafter, that the invention is applicable to the handling of other materials having handling or forming characteristics similar to polytetrafluoroethylene.

The manufacture of tubing from polytetrafluoroethylene has been limited heretofore to comparatively short lengths. This limitation has been particularly pronounced in the production of tubing of large diameter, ¾ inch or larger. At present the tubing is produced by extruding fixed lengths from a paste mixture of the resin and a lubricant. The extrusion is carried on at room temperature. This provides an extremely fragile product which must be sintered before it attains the various characteristics for which it is now in great demand. In order to sinter a length of the extruded tubing it must be placed in an oven or other enclosure wherein it can be subjected to a heating and sintering cycle at elevated temperatures.

As mentioned previously, the material is extremely fragile before sintering and must be handled with care. The procedure presently followed is to place the unsintered length of tubing within a protective tube, e.g., a steel pipe, of somewhat larger diameter. In this manner, theoretically, large lengths can be handled since the external tube can be supported along its length in the oven without sagging. Unfortunately the external tube has certain adverse effects upon the finished product.

The first of these effects or phenomena is encountered in connection with the sintering of long lengths of extruded tubing within a tube or pipe. It is a phenomenon which has been variously termed "draw-down" or "necking-down." It manifests itself in the reduction in diameter of the tubing along an intermediate section relative to the diameter at the ends. The tentative explanation for this phenomenon resides in the fact that the tubing shrinks longitudinally while it is being heated and sintered. As it is shrinking the ends are being dragged along the surface of the protective tube, and, if the tubing is long enough, the drag thus created tends to stretch it in the vicinity of its central section.

Another adverse effect or problem develops upon submerging in a quench bath a sintered length of tubing supported by the protective tube or metal pipe. It has been observed that with all tubing except the smaller diameters the tubing collapses the moment it is submerged. It is believed that this collapse is brought about by the creation of steam in the confined space between the walls of the tubing and the surrounding protective tube.

It is, therefore, an object of the present invention to provide a process for sintering longer lengths than heretofore possible of tubing of polytetrafluoroethylene, or the like, without significant draw-down.

It is a further object of the invention to provide a process for quenching tubular lengths of polytetrafluoroethylene, or the like, without the possibility of collapse while supported within a protective tube.

Both of the above objects are conveniently attained by inserting a light weight core member of suitable size, shape and strength into the resinous tubing before it is sintered and/or quenched. The invention will be better understood after reading the following detailed description thereof with reference to the accompanying drawings in which.

Figure 1:
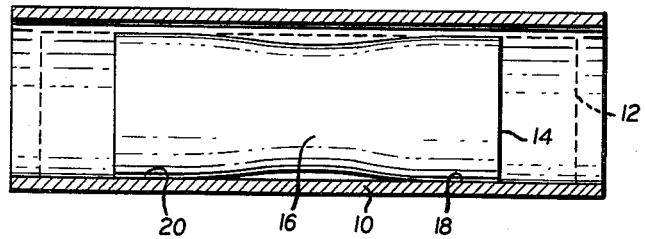
Fig. 1 is a diagrammatic representation of a length of tubing supported within a pipe and illustrating the draw-down phenomenon.

Reference should now be had to Fig. 1 wherein the protective tube 10, hereinafter referred to as a pipe, is shown in longitudinal section, and the tubing undergoing sintering is shown in diagrammatic outline. The dotted outline 12 represents an extruded length of tubing as it would appear when disposed within the pipe prior to sintering. The solid line representation 14 shows the outline of the tubing after it is sintered. As shown in somewhat exaggerated form the sintered tubing will have been drawn down in the region 16. As previously mentioned, this is believed to be caused by the frictional drag at the points of surface contact 18 and 20. It should be recognized that with short lengths of tubing the defect may not be noticeable. However, as the length of the tubing is increased the defect becomes more and more pronounced. There is thus a limit on the maximum length of tubing that can be sintered by this method. As previously mentioned the tubing will also be subject to collapse upon immersion in the quench bath.

Figure 2:
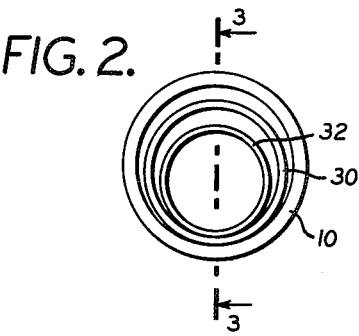
Fig. 2 is an end view of the supporting pipe the tubing and the core member in place.
Figure 3:
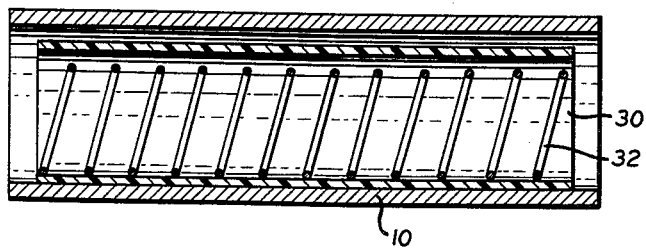
Fig. 3 is a longitudinal section on line 3—3 of Fig. 2 showing the details thereof.

In Figs. 2 and 3 there is illustrated the novel remedy which forms the basis of the present invention and which serves to overcome both of the above-mentioned problems. The supporting pipe is again designated by the numeral 10 and the extruded length of tubing is now designated by the numeral 30. In accordance with the invention, a light weight core member, preferably flexible and in the form of a coil 32 of steel wire, is inserted within the tubing 30. The coil 32 has a generally circular outline as viewed from one end (see Fig. 2) and may take the form of a helix having approximately 2 turns per inch. For best results it is preferred that the diameter of the core member, i.e., the aforementioned circular outline, be approximately 9/10 the internal diameter of the tubing 30 prior to sintering. Preferably the coil 32 is formed from any 300 series of stainless steel. Actually any carbon steel or other metal which is highly resistant to corrosion under heat may be used. In fact, it is also conceivable that the coil could be formed out of plastic so long as it would withstand the sintering temperature.

For a reason which is not yet quite clear the presence of the coil 32 within the tubing 30 while it is being sintered has the effect of appreciably reducing the draw-down previously mentioned. It has been theorized that in the absence of the core the tubing 30 has a tendency to get out of round and somewhat elliptical thereby increasing the area of surface contact between it and the supporting pipe. It is thought, if this assumption is correct, that the coil 32 tends to maintain the tubing 30 in a more nearly circular configuration thereby minimizing the surface contact. This explanation is purely conjectural and is offered merely for what it is worth. The important thing is that the presence of the core member does have the unexpected result of reducing the draw-down.

In a similar manner the core member 32 offers sufficient internal support to the tubing while it is being quenched so as to prevent collapse thereof. It has been found in the processing of both ¾ inch and 1 inch diameter tubing that a coil formed of $\frac{1}{16}$ inch diameter wire has no observable adverse effect upon the tubing. Tests have shown that the strength characteristics of the walls of the tubing remain unimpaired.

Figure 4:
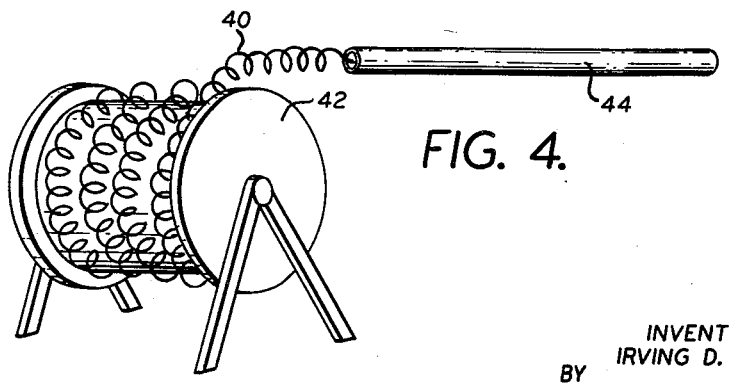
Fig. 4 is a diagrammatic representation of the set up for feeding a flexible coiled core member from a supply reel into the resinous tubing.

The use of a coil as the core member has a decided advantage over most any other form of core member as dramatically illustrated in Fig. 4. In this figure the coil designated 40 is wound upon a supply reel 42 from which it may be reeled into the tubing 44. By making the core flexible it requires only a small space for storage and for enabling assembly during the practice of the process. This advantage is mentioned specifically because it should now be apparent that certain aspects of the inventive process can be performed with the use of a rigid or semi-rigid core member. One of the limitations, however, is that the core must be sufficiently light in weight that it will not embed in the wall of the tubing while the tubing is being sintered. Nevertheless it is contemplated that a perforated tube of metal or other suitable material could be employed, if not in the sintering phase of the operation, at least in the quenching phase.

It is to be understood that the core member may be inserted before either the quenching or sintering step. It may be employed only for reducing draw-down or it may be employed only for preventing collapse during quenching or it may be employed for both purposes. It should also be understood that although a stainless steel tube or pipe is preferably employed as the external support, other materials may be used so long as they can withstand the sintering and quenching operations.

The proper choice for size of the core member is dictated by several considerations. It must be large enough with respect to the particular tubing involved to bring about its beneficial effect. During the sintering of polytetrafluoroethylene, or the like, a length of tubing formed thereof not only shrinks in length but also in diameter. The amount of radial shrinkage may be determined experimentally for any given diameter of tubing. The core member is then preferably dimensioned so that its diameter is just slightly less than the minimum internal diameter attained by the tubing as a result of the aforementioned shrinkage. This will preclude any embedding or clinging between the core and the tubing and make for easy removal of the core member. Here again the coiled form of the core member has the decided advantage that it can be easily removed even if there should be an unusual amount of radial shrinkage. This follows from the inherent nature of a helix or coil that if it is stretched longitudinally its diameter will be reduced.

The process forming the basis of the present invention has been fully described with reference to a preferred method of carrying it out. It is to be understood, however, that numerous modifications and variations will appear to those skilled in the art and, therefore, it is intended that they should be encompassed by the appended claims.

What I claim is:

1. In the process of sintering and subsequently quenching an elongated tubular member of polytetrafluoroethylene or the like material which is supported within a protective tube while being quenched, the steps of inserting into the tubular member before it is quenched a light weight core member having a diameter slightly less than the internal diameter of the tubing and of sufficient strength to prevent the tubular member from collapsing, as distinguished from natural shrinkage, during the quenching operation but adapted to be readily removable therefrom after the quenching operation, and thereafter quenching said tubular member by immersion in a water bath with the core member in place.

2. In the process of sintering and subsequently quenching an elongated tubular member of polytetrafluoroethylene or the like material which is supported within a protective tube at least while being quenched, the steps of inserting into the tubular member before it is sintered a light weight core member of such size, shape and strength as to prevent the tubular member from collapsing during the quenching operation but adapted to be readily removable therefrom after the quenching operation, said core member having a cross-section slightly smaller than the minimum internal cross-section attained by said tubular member during sintering, and thereafter sintering and quenching said tubular member with the core member in place, whereby during the sintering step the core member minimizes the necking-down of the tubular member normally caused by drag in response to longitudinal shrinkage of the tubular member within the protective tube.

3. In the process of sintering and subsequently quenching an elongated cylindrical tube of polytetrafluoroethylene or the like material which is supported within a metallic pipe while being sintered and quenched, the steps of inserting into the tube before it is sintered a light weight core member having a generally circular outline as viewed from one end and of such strength as to prevent the tube from collapsing during the quenching operation but having a cross-section which is smaller than the minimum cross-section attained by said tube during sintering such as to be removable therefrom after the quenching operation, and thereafter sintering and quenching said tube with the core member in place.

4. The process according to claim 3, wherein the diameter of the outline of said core member is approximately $\frac{9}{10}$ths the internal diameter of said tube before sintering.

5. In the process of sintering an elongated cylindrical tube of polytetrafluoroethylene or the like material which is supported within a metallic pipe while being sintered, the steps of inserting into the tube before it is sintered a light weight core member having a generally circular outline as viewed from one end and of such size as to reduce the necking-down of the tube during the sintering operation but having a cross-section which is smaller than the minimum cross-section attained by said tube during sintering such as to be removable therefrom after the tube is sintered and cooled, and thereafter sintering and cooling said tube with the core member in place.

References Cited in the file of this patent

UNITED STATES PATENTS

| Number | Name | Date |
|---|---|---|
| 1,602,165 | Parker | Oct. 5, 1926 |
| 1,923,148 | Hotchner | Aug. 22, 1933 |
| 2,280,102 | Somes | Apr. 21, 1942 |
| 2,389,038 | German | Nov. 13, 1945 |
| 2,485,691 | Bogese | Oct. 25, 1949 |
| 2,685,707 | Llewellyn et al. | Aug. 10, 1954 |